(12) United States Patent
Lee et al.

(10) Patent No.: US 11,817,559 B2
(45) Date of Patent: Nov. 14, 2023

(54) APPARATUS AND METHOD FOR MANUFACTURING SECONDARY BATTERY

(71) Applicant: LG Energy Solution, Ltd., Seoul (KR)

(72) Inventors: Sang Kyun Lee, Daejeon (KR); Min Soo Park, Daejeon (KR); Dong Yeon Kim, Daejeon (KR); Jin Hak Kong, Daejeon (KR); Eui Jin Hong, Daejeon (KR)

(73) Assignee: LG Energy Solution, Ltd.

( * ) Notice: Subject to any disclaimer, the term of this patent is extended or adjusted under 35 U.S.C. 154(b) by 235 days.

(21) Appl. No.: 17/311,581

(22) PCT Filed: Mar. 31, 2020

(86) PCT No.: PCT/KR2020/004428
§ 371 (c)(1),
(2) Date: Jun. 7, 2021

(87) PCT Pub. No.: WO2020/246696
PCT Pub. Date: Dec. 10, 2020

(65) Prior Publication Data
US 2022/0123354 A1 Apr. 21, 2022

(30) Foreign Application Priority Data
Jun. 7, 2019 (KR) .................. 10-2019-0067388

(51) Int. Cl.
*H01M 10/058* (2010.01)
*H01M 50/10* (2021.01)

(52) U.S. Cl.
CPC ......... *H01M 10/058* (2013.01); *H01M 50/10* (2021.01)

(58) Field of Classification Search
CPC .................... H01M 10/058; H01M 50/10
See application file for complete search history.

(56) References Cited

U.S. PATENT DOCUMENTS

| 2009/0075168 A1 | 3/2009 | Lee |
| 2009/0311592 A1 | 12/2009 | You et al. |

(Continued)

FOREIGN PATENT DOCUMENTS

| CN | 107408720 A | 11/2017 |
| DE | 102010001177 A1 | 7/2011 |

(Continued)

OTHER PUBLICATIONS

International Search Report for PCT/KR2020/004420 dated Jul. 8, 2020; 3 pages.

(Continued)

*Primary Examiner* — Jane J Rhee
(74) *Attorney, Agent, or Firm* — Lerner David LLP

(57) ABSTRACT

An apparatus for manufacturing a secondary battery includes: a recess induction part configured to allow a folding part folded in a battery case of a secondary battery to be recessed inward so as to provide a recess part when the battery case of the secondary battery is folded; a first guide, of which one side of one end is recessed to define a concave space, wherein, when the battery case of the secondary battery is folded, the one end is configured to be inserted into the battery case to push the folding part to an outside so that the recess induction part is configured to be inserted into the concave space; and a second guide configured to hold a sealing part of the battery case so as to fix the battery case.

19 Claims, 16 Drawing Sheets

(56) References Cited

U.S. PATENT DOCUMENTS

| | | |
|---|---|---|
| 2011/0059344 A1 | 3/2011 | Kawase et al. |
| 2013/0323563 A1 | 12/2013 | Eo |
| 2016/0343999 A1 | 11/2016 | Yonemura et al. |
| 2017/0047616 A1 | 2/2017 | Takahata |
| 2017/0133707 A1 | 5/2017 | Han et al. |
| 2018/0047950 A1 | 2/2018 | Lim et al. |
| 2018/0219245 A1 | 8/2018 | Choi et al. |
| 2019/0027714 A1 | 1/2019 | Jung et al. |
| 2019/0051868 A1 | 2/2019 | Lee et al. |
| 2019/0393455 A1 | 12/2019 | Seo et al. |
| 2020/0067029 A1 | 2/2020 | Park et al. |
| 2020/0287198 A1 | 9/2020 | Takata |
| 2020/0365836 A1 | 11/2020 | Jung et al. |
| 2022/0029192 A1* | 1/2022 | Lee .................. H01M 10/0585 |

FOREIGN PATENT DOCUMENTS

| | | |
|---|---|---|
| EP | 3321991 A1 | 5/2018 |
| JP | H0237661 A | 2/1990 |
| JP | 2001060452 A | 3/2001 |
| JP | 2001118547 A | 4/2001 |
| JP | 5418476 B2 | 2/2014 |
| JP | 2015210892 A | 11/2015 |
| JP | 2016219416 A | 12/2016 |
| JP | 6354982 B2 | 7/2018 |
| JP | 6373208 B2 | 8/2018 |
| JP | 2018527719 A | 9/2018 |
| KR | 100624959 B1 | 9/2006 |
| KR | 101244549 B1 | 3/2013 |
| KR | 20130133585 A | 12/2013 |
| KR | 101420060 B1 | 7/2014 |
| KR | 20160118931 A | 10/2016 |
| KR | 20170054071 A | 5/2017 |
| KR | 20170057754 A | 5/2017 |
| KR | 101753336 B1 | 7/2017 |
| KR | 20170109327 A | 9/2017 |
| KR | 20180028714 A | 3/2018 |
| KR | 20180029856 A | 3/2018 |
| KR | 20180082890 A | 7/2018 |
| KR | 20180085185 A | 7/2018 |
| KR | 20180118929 A | 11/2018 |
| KR | 20190010434 A | 1/2019 |
| KR | 20190024755 A | 3/2019 |
| WO | 2019017637 A1 | 1/2019 |
| WO | 2019045329 A1 | 3/2019 |
| WO | 2019045447 A1 | 3/2019 |
| WO | 2019053867 A1 | 3/2019 |

OTHER PUBLICATIONS

International Search Report for PCT/KR2020/004428 dated Jul. 9, 2020; 3 pages.

Extended European Search Report including Written Opinion for Application No. 20791753.5 dated Dec. 23, 2021, pp. 1-9.

Extended European Search Report including Written Opinion for Application No. 20817773.3 dated Jan. 24, 2022, pp. 1-9.

* cited by examiner

APPARATUS AND METHOD FOR MANUFACTURING SECONDARY BATTERY

CROSS-REFERENCE TO RELATED APPLICATIONS

The present application is a national phase entry under 35 U.S.C. § 371 of International Application No. PCT/KR2020/004428, filed Mar. 31, 2020, published in Korean, which claims the benefit of the priority of Korean Patent Application No. 10-2019-0067388, filed on Jun. 7, 2019, both of which are hereby incorporated by reference in their entireties.

TECHNICAL FIELD

The present invention relates to an apparatus and method for manufacturing a secondary battery, and more particularly, to an apparatus and method for manufacturing a secondary battery which are capable of reducing a size error and increasing a ratio of an energy density to a volume.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

Such a secondary battery is classified into a pouch type secondary battery and a can type secondary battery according to a material of a battery case accommodating an electrode assembly. In the pouch type secondary battery, the electrode assembly is accommodated in a pouch made of a flexible polymer material having a variable shape. Also, in the can type secondary battery, an electrode assembly is accommodated in a case made of a metal or plastic material having a predetermined shape.

The pouch type battery case is manufactured by performing drawing molding on a pouch film having flexibility to form a cup part. The drawing molding is performed by inserting a pouch film into a press and applying a pressure to the pouch film through a punch to stretch the pouch film. In addition, when the cup part is formed, an electrode assembly is accommodated in an accommodation space of the cup part, and then, the battery case is folded to seal a sealing part, thereby manufacturing a secondary battery.

When the cup part is molded in the pouch film, two cup parts may be drawn and molded to be symmetrical to each other in one pouch film. Also, the electrode assembly may be accommodated in the accommodation space of the cup part, and then, the battery case may be folded so that the two cup parts face each other. As a result, since the two cup parts accommodate the one electrode assembly, the electrode assembly has a thickness T thicker than that of an electrode assembly accommodated in only one cup part. Also, since the battery case is folded to form one edge of the secondary battery, only three edges except for the one edge may be sealed when a sealing process is performed later. Thus, the number of edges to be sealed may be reduced to improve a process rate and reduce the number of trimming processes.

FIG. 1 is a plan view of a pouch type secondary battery 3 according to the related art.

When a battery case is folded, and heat and a pressure are applied to seal the battery case, a portion of a folded edge of the secondary battery 3, i.e., a portion of a folding part 336, protrudes to the outside. This is called a bat ear 2.

As illustrated in FIG. 1, when the bat ear 2 protrudes, an unnecessary volume further increases, and thus an error occurs in a designed size of the secondary battery 3. Thus, when assembling the secondary batteries 3 to manufacture a battery module or the like, there is a problem in that it is not easy to assembly the secondary batteries 3, and each of the secondary batteries 3 has to be designed with a small size from the beginning. Also, since the volume of the secondary battery 3 increases as a whole, there is also a problem in that a ratio of the energy density to the volume decreases.

DISCLOSURE OF THE INVENTION

Technical Problem

An object to be achieved by the present invention is to provide an apparatus and method for manufacturing a secondary battery, which are capable of reducing an error in size and increasing a ratio of an energy density to a volume.

The objects of the present invention are not limited to the aforementioned object, but other objects not described herein will be clearly understood by those skilled in the art from descriptions below.

Technical Solution

An apparatus for manufacturing a secondary battery according to an embodiment of the present invention for achieving the above object includes: a recess induction part configured to allow a folding part folded in a battery case of a secondary battery to be recessed inward so as to provide a recess part when the battery case of the secondary battery is folded; a first guide, of which one side of one end is recessed to define a concave space, wherein, when the battery case of the secondary battery is folded, the one end is configured to be inserted into the battery case to push the folding part to an outside so that the recess induction part is configured to be inserted into the concave space; and a second guide configured to hold a sealing part of the battery case so as to fix the battery case.

In addition, the recess induction part may include a plurality of recess induction parts configured to move linearly in a direction parallel to a direction toward each other.

In addition, the first guide may be inserted into the battery case through the sealing part before the sealing part is sealed.

In addition, when the first guide pushes the folding part to the outside, the folding part may be inserted into the concave space together with the recess induction part to define a recess part.

In addition, in the first guide, the one side of the one end may be recessed inward to be filleted.

In addition, in the first guide, the one side of the one end may be recessed inward and filleted to define the concave space with a plurality of planes, and an exterior angle defined by the plurality of planes may be provided as an obtuse angle.

In addition, the apparatus may further include a sealing tool configured to apply heat and a pressure to the sealing part to seal the sealing part.

In addition, before the sealing part is sealed, the first guide may be pulled out from the battery case.

In addition, the first guide may have a thickness less a thickness of the battery case that when the battery case is folded.

In addition, the second guide may have a forceps shape so that it is configured to hold the sealing part from opposing surfaces.

A method for manufacturing a secondary battery according to an embodiment of the present invention for achieving the above object includes: accommodating an electrode assembly, in which electrodes and separators are alternately stacked, in a battery case; recessing a folding part folded in the battery case inward with a recess induction part to form a recess part when the battery case is folded; of inserting one end of a first guide, of which one side of the one end is recessed to form a concave space, into the battery case; pushing the folding part of the battery case to an outside with the first guide so that the recess induction part is inserted into the concave space; fixing the battery case by holding a sealing part of the battery case with a second guide; and sealing the sealing part by applying heat and a pressure to the sealing part with a sealing tool.

In addition, the method may further include, after the step of fixing the battery case and before the step of sealing the sealing part, a step of pulling out the first guide from the battery case.

A secondary battery according to an embodiment of the present invention for achieving the above object is manufactured through the method for manufacturing the secondary battery.

Particularities of other embodiments are included in the detailed description and drawings.

Advantageous Effects

The embodiments of the present invention may have at least the following effects.

The formation of the bat ear may be prevented to reduce the error occurring in the designed size of the secondary battery, and the secondary batteries may be easily assembled to manufacture the battery module.

In addition, since the unnecessary volume of the secondary battery decreases as a whole, a ratio of the energy density to the volume may increase.

The effects of the prevent invention are not limited by the aforementioned description, and thus, more varied effects are involved in this specification.

MODE FOR CARRYING OUT THE INVENTION

Figure 1:
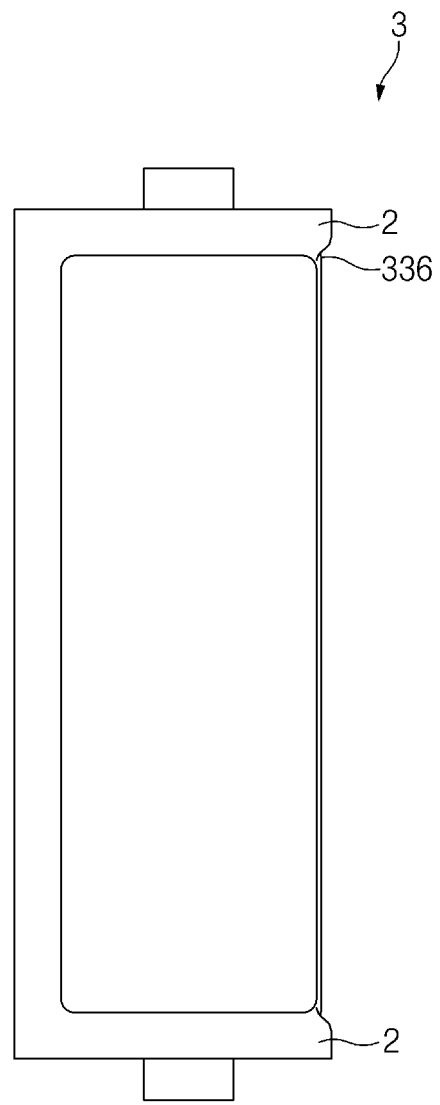
FIG. 1 is a plan view of a pouch type secondary battery according to a related art.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 2:
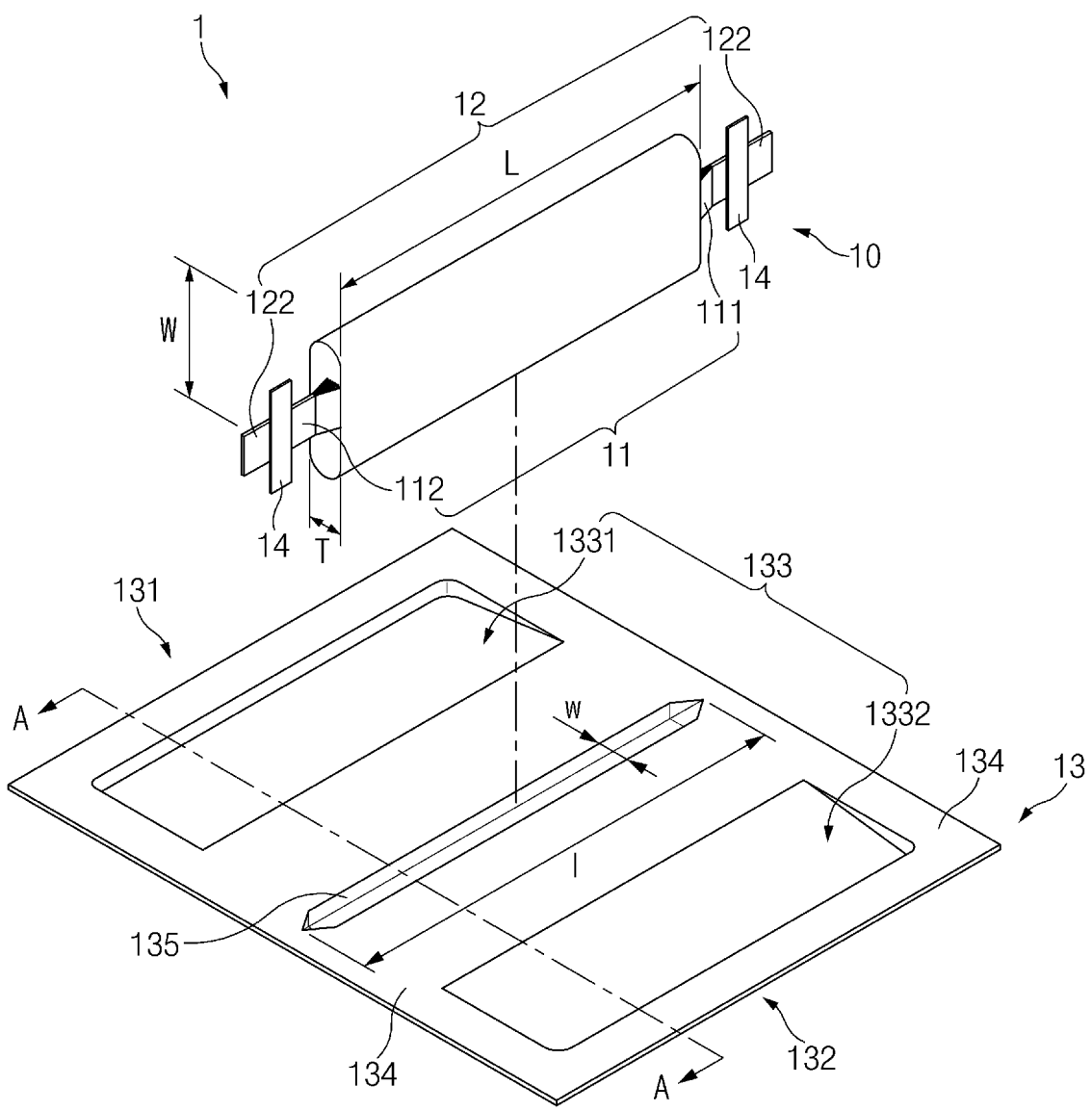
FIG. 2 is an assembly view of a pouch type secondary battery according to an embodiment of the present invention.
Figure 3:
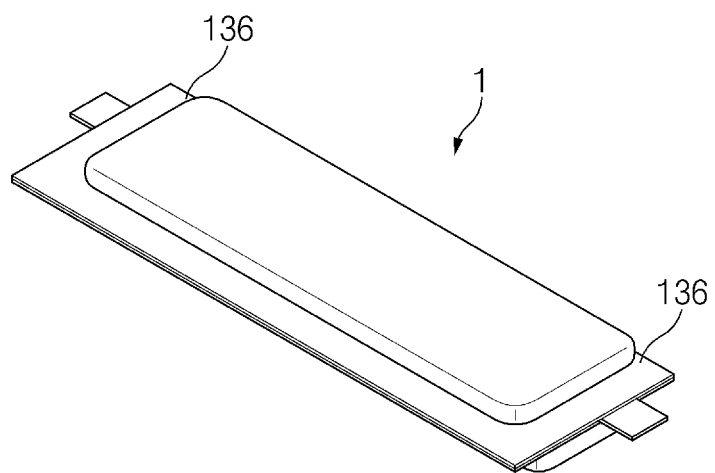
FIG. 3 is a perspective view of the pouch type secondary battery according to an embodiment of the present invention.

FIG. 2 is an assembly view of a pouch type secondary battery 1 according to an embodiment of the present invention, and FIG. 3 is a perspective view of the pouch type secondary battery 1 according to an embodiment of the present invention.

As illustrated in FIG. 2, the pouch type secondary battery 1 according to an embodiment of the present invention includes a pouch type battery case 13 and an electrode assembly 10 accommodated in the battery case 13.

The electrode assembly 10 may be a stacked structure including two electrodes such as a cathode and an anode and a separator interposed between the electrodes to insulate the electrodes from each other or disposed at a left or right side of one electrode. The stacked structure may have various shapes without being limited in shape. For example, the cathode and the anode, each of which has a predetermined standard, may be stacked with the separator therebetween, or the stacked structure may be wound in the form of a jelly roll. Each of the two electrodes has a structure in which active material slurry is applied to a metal foil or a mesh-shaped collector including aluminum and copper. The slurry may be usually formed by agitating a granular active material, an auxiliary conductor, a binder, and a plasticizer with a solvent added. The solvent may be removed in the subsequent process.

As illustrated in FIG. 2, the electrode assembly 10 includes the electrode tabs 11. The electrode tabs 11 are respectively connected to a positive electrode and a negative electrode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 2, the electrode tabs 11 may protrude in each of different directions of the electrode assembly 10, but is not limited thereto. For example, the electrode tabs may protrude in parallel to each other from one side in the same direction.

In the electrode assembly 10, the electrode lead 12 is connected to the electrode tab 11 through spot welding. Also, a portion of the electrode lead 12 is surrounded by an insulation part 14. An insulation part 14 may be disposed to be limited within a sealing part 134, at which a first case 131 and a second case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in different directions or extend in the same direction according to the formation positions of the positive electrode tab 111 and the negative electrode tab 112. The positive electrode lead 121 and the negative electrode lead 122 may be made of materials different from each other. That is, the cathode lead 121 may be made of the same material as the cathode plate, i.e., an aluminum (Al) material, and the anode lead 122 may be made of the same material as the anode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material and is manufactured by performing drawing molding on the pouch film having flexibility to form a cup part 133. Also, the battery case 13 accommodates the electrode assembly 10 so that a portion of the electrode lead 12, i.e., the terminal part is exposed and then is sealed. As illustrated in FIG. 2, the battery case 13 includes a first case 131 and a second case 132. A first cup part 1331 and a second cup part 1332 are respectively provided in the first case 131 and the second case 132 to provide an accommodation space in which the electrode assembly 10 is accommodated. Also, the battery case 13 is folded to allow the electrode assembly 10 to be accommodated in the accommodation space of the cup part 133, thereby preventing the electrode assembly 10 from being separated to the outside of the battery case 13.

When the two cup parts 133 are drawn and molded to be symmetrical to each other in the pouch film, an accommodation part 135 may be drawn and molded together between the two cup parts 133. As illustrated in FIG. 2, the accommodation part 135 is a space which is lengthily defined in a longitudinal direction of edges of the first cup part 1331 and the second cup part 1332, which face each other, and in which the electrode assembly 10 is accommodated first, between the first cup part 1331 and the second cup part 1332. The accommodation part 135 accommodates one side of the electrode assembly 10 first to fix a position of the one side of the electrode assembly 10 so that the electrode assembly 10 is easily accommodated in the cup part 133. For this, as illustrated in FIG. 2, the accommodation part 135 has a width W and length I, which respectively correspond to a thickness T and length L of the electrode assembly 10 and is disposed at a position spaced the same distance from the first cup part 1331 and the second cup part 1332. Thus, a central axis defined in a longitudinal direction of the accommodation part 135 functions as a symmetrical axis of the first cup part 1331 and the second cup part 1332.

When the electrode lead 12 is connected to the electrode tab 11 of the electrode assembly 10, and the insulation part 14 is disposed on a portion of the electrode lead 12, the electrode assembly 10 is accommodated in the accommodation part 135. Also, when the first case 131 and the second case 132 are folded, the electrode assembly 10 is accommodated in the accommodation space provided in the first and second cup parts 1331 and 1332, and then, the first and second cup parts 1331 and 1332 surround the electrode assembly 10. Also, an electrolyte is injected into the accommodation space, and sealing parts 134 disposed on edges of the first case 131 and the second case 132 are sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 3, the pouch type secondary battery 1 may be manufactured through the above-described method.

Figure 4:
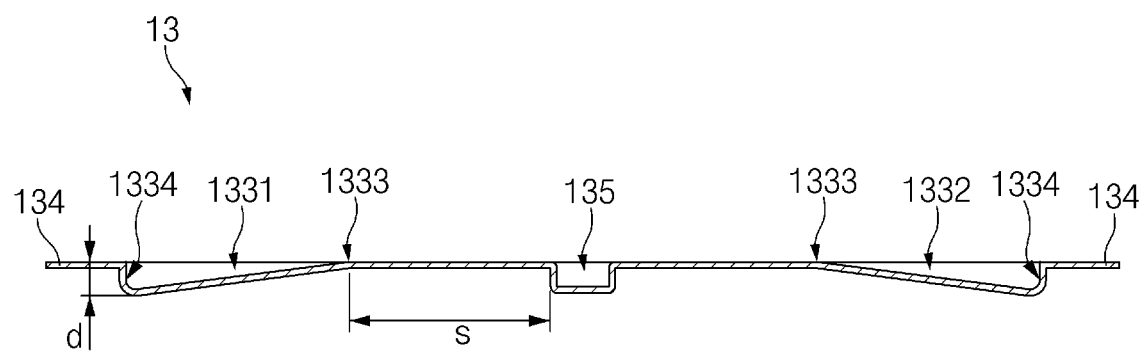
FIG. 4 is a cross-sectional view of a pouch type battery case, taken along line A-A' of FIG. 2, according to an embodiment of the present invention.

FIG. 4 is a cross-sectional view of the pouch type battery case 13, taken along line A-A' of FIG. 2, according to an embodiment of the present invention.

As illustrated in FIG. 4, the cup part 133 has a shape in which a depth d gradually increases from a portion 1333 corresponding to a central portion of the width W of the electrode assembly 10 toward a portion 1334 corresponding to an upper edge of the electrode assembly 10. Also, a section between the accommodation part 135 and the cup part 133 has a flat shape with little change in depth.

The deepest depth d in the cup part 133 is a portion corresponding to the upper edge of the electrode assembly 10, and the depth d is preferably deeper than half of the thickness T of the electrode assembly 10. Thereafter, when the first and second cup parts 1331 and 1332 face each other, and the sealing parts 134 of the battery case 13 are sealed, the cup part 133 accommodates the electrode assembly 10 therein. However, if the depth d of each of the first cup part 1331 and the second cup part 132 is not deeper than half of the thickness T of the electrode assembly 10, after the first cup part 1331 and the second cup part 1332 accommodate the electrode assembly 10 therein, the sealing parts 134 may not contact each other so as not to be sealed, or even if the sealing parts contact each other, a contact area is too narrow to cause sealing failure.

A section between the accommodation part 135 and the cup part 133 has a length S that varies according to the width W and thickness T of the electrode assembly 10. That is, it is preferable that the shorter the width W of the electrode assembly 10, the shorter the length S of the section between the accommodation part 135 and the cup part 133. On the other hand, it is preferable that the longer the width W of the electrode assembly 10, the longer the length S of the section between the accommodation part 135 and the cup part 133. Also, since the thicker the thickness T of the electrode assembly 10, the deeper the depth d of the cup part 133, it is preferable that that the length S of the section between the accommodation part 135 and the cup part 133 is shortened. On the other hand, since the thinner the thickness T of the electrode assembly 10, the shallower the depth d of the cup part 133, it is preferable that the length S of the section between the accommodation part 135 and the cup part 133 is longer.

Figure 5:
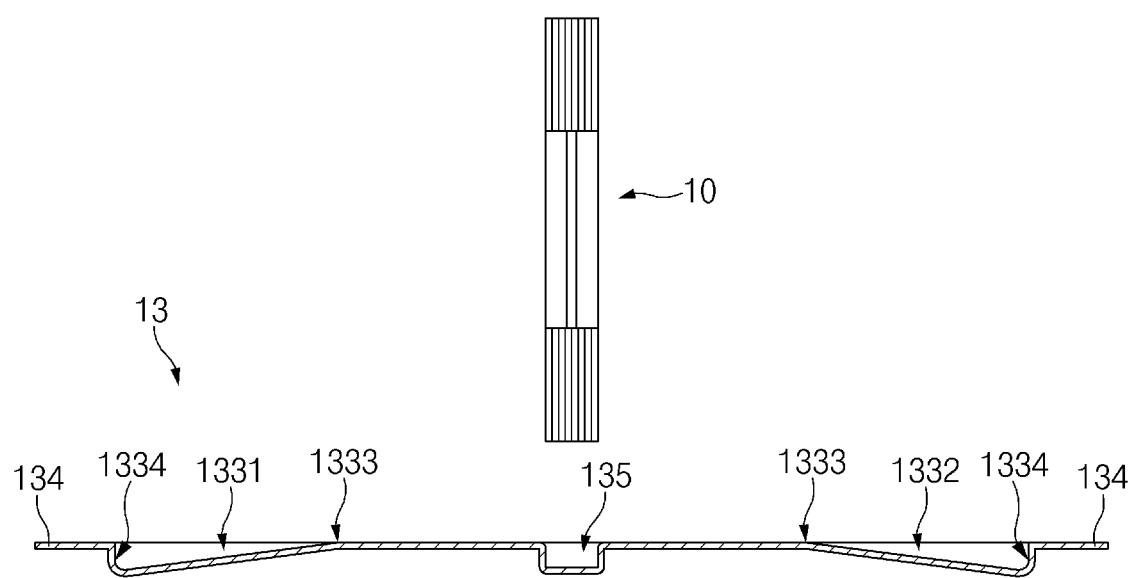
FIG. 5 is a cross-sectional view illustrating a state in which an electrode assembly is being accommodated in the pouch type battery case of FIG. 4.
Figure 6:
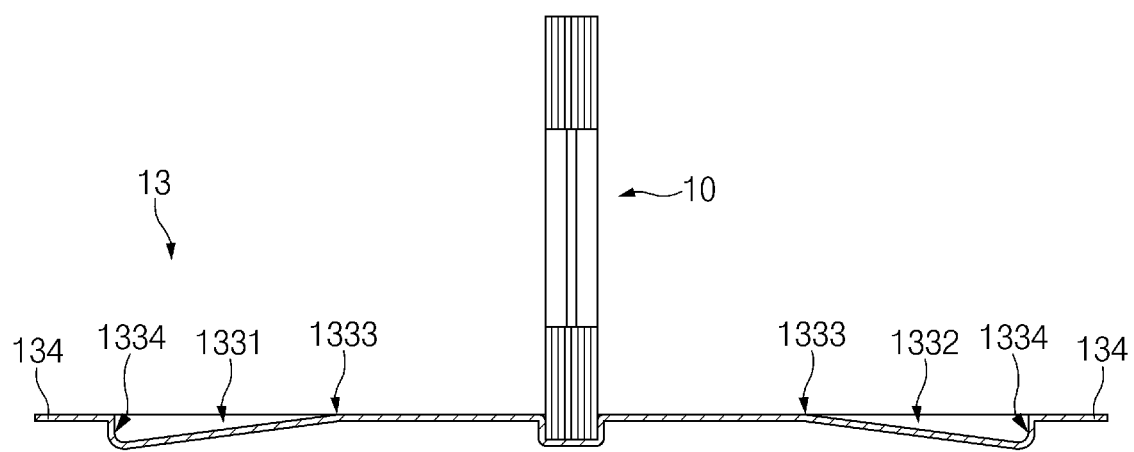
FIG. 6 is a cross-sectional view illustrating a state in which the electrode assembly is accommodated in the pouch type battery case of FIG. 4.

FIG. 5 is a cross-sectional view illustrating a state in which the electrode assembly 10 is being accommodated in the pouch type battery case 13 of FIG. 4, and FIG. 6 is a cross-sectional view illustrating a state in which the electrode assembly 10 is accommodated in the pouch type battery case 13 of FIG. 4.

The accommodation part 135 accommodates one side of the electrode assembly 10. Here, as illustrated in FIGS. 2 and 5, it is preferable that the electrode assembly 10 is accommodated upright from the top to the bottom. Thus, when the battery case 13 is folded later, the first and second cup parts 1331 and 1332 respectively disposed on both sides of the electrode assembly 10 may surround the electrode assembly 10 to accommodate the electrode assembly 10 therein.

As described above, since the accommodation part 135 has the width W and length I, which respectively correspond to the thickness T and length L of the electrode assembly 10, as illustrated in FIG. 6, the electrode assembly 10 may be easily accommodated in the accommodation part 135 and then fixed in position.

Figure 7:
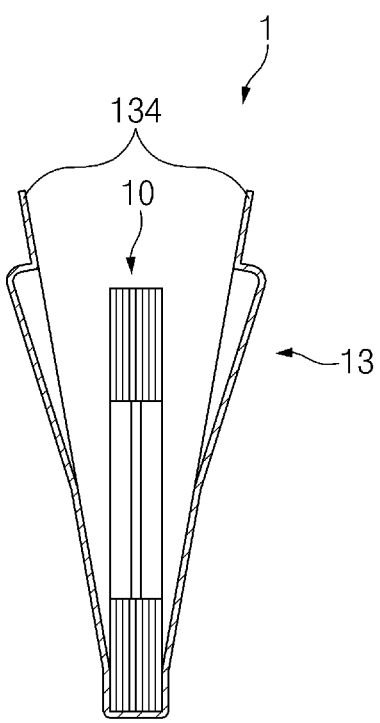
FIG. 7 is a cross-sectional view illustrating a state in which the pouch type battery case of FIG. 4 is being folded.
Figure 8:
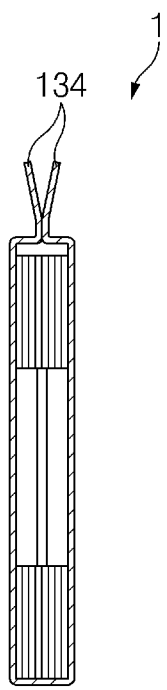
FIG. 8 is a cross-sectional view illustrating a state in which the pouch type battery case of FIG. 4 is folded.

FIG. 7 is a cross-sectional view illustrating a state in which the pouch type battery case 13 of FIG. 4 is being folded, and FIG. 8 is a cross-sectional view illustrating a state in which the pouch type battery case 13 of FIG. 4 is folded.

After the electrode assembly 10 is accommodated in the accommodation part 135, the first case 131 and the second case 132, which are respectively disposed at both sides of the accommodation part 135, are folded upward as illustrated in FIG. 7. As a result, as illustrated in FIG. 8, the two cup parts 133 may face each other to surround the electrode assembly 10 so that the electrode assembly 10 is accommodated in the accommodation space provided in the cup parts 133.

The first case 131 and the second case 132 are bent from both sidewalls that define the accommodation part 135 and then connected to each other, respectively. Also, when the first case 131 and the second case 132 are folded, the first and second cases 131 and 132, which are bent, are unfolded from both the sidewalls to accommodate the electrode assembly 10 in the cup parts 133. That is, the battery case 13 is folded when viewed as a whole, but the bent portion is unfolded when viewed from both the sidewalls of the accommodation part 135.

As described above, after the first case 131 and the second case 132 are folded, when the sealing part 134 is sealed using a sealing tool 23 (see FIG. 16), the secondary battery 1 is completely manufactured.

Figure 9:
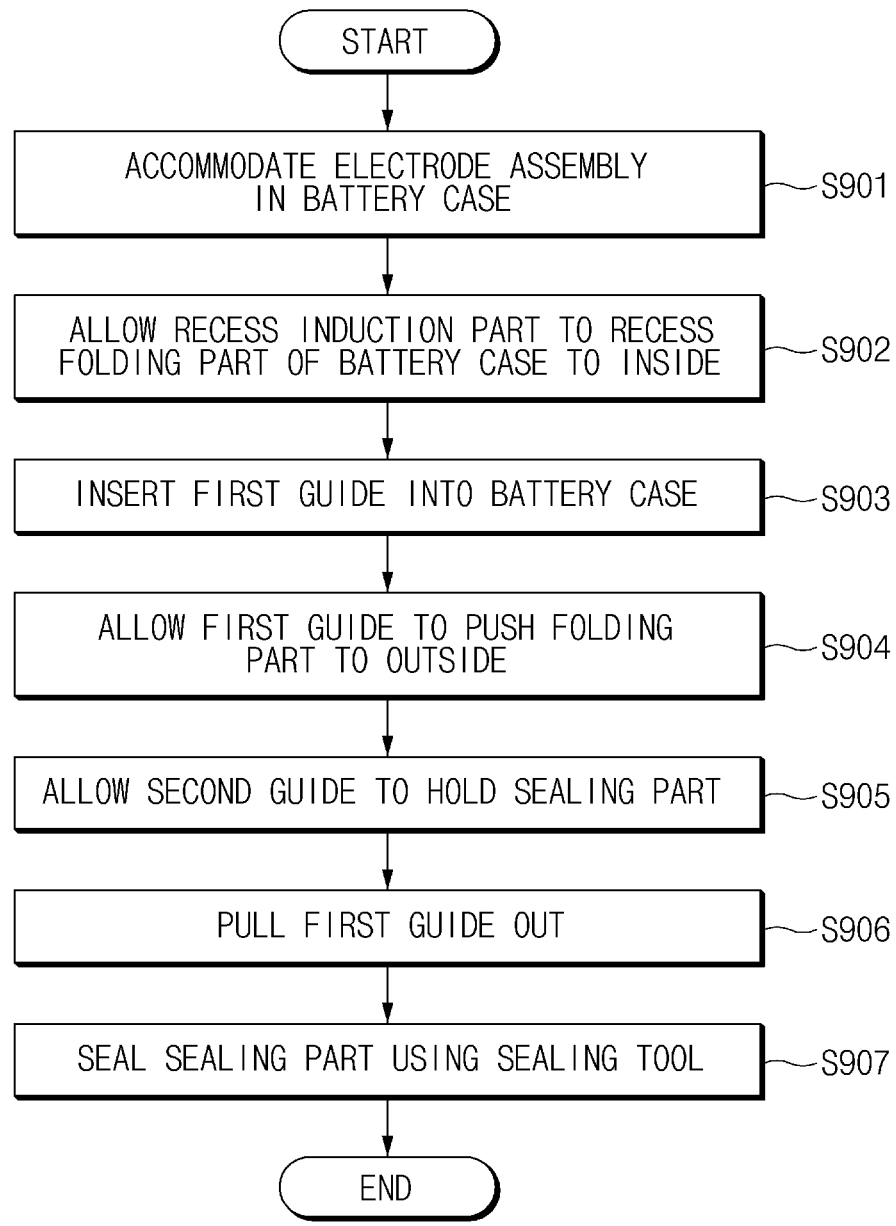
FIG. 9 is a flowchart illustrating a method for manufacturing a secondary battery according to an embodiment of the present invention.

FIG. 9 is a flowchart illustrating a method for manufacturing the secondary battery 1 according to an embodiment of the present invention.

As described above, in the related art, when the battery case 13 is folded, and heat and a pressure are applied to the sealing part 134 to seal the sealing part 134, a portion of the folding part 336 protrudes to the outside to form a bat ear 2. Thus, since an unnecessary volume of the secondary battery 3 increases, an error occurs in a designed size. Also, when assembling the secondary batteries 3 to manufacture a battery module or the like, there is a problem in that it is not easy to assemble the secondary batteries 3, and each of the secondary batteries 3 has to be designed with a small size from the beginning. Also, since the volume of the secondary battery 3 increases as a whole, there is also a problem in that a ratio of the energy density to the volume decreases.

Here, the folding part 136 refers to an area formed to extend in a longitudinal direction of an accommodation part 135 from both ends of the accommodation part 135. Also, the folding part 136 is a portion that is folded from each of both ends of the accommodation part 135 in the battery case 13 when the battery case 13 is folded and constitutes a portion of the sealing part 134.

According to an embodiment of the present invention, a portion 1361 of the folding part 136, which has formed as the bat ear 2, may be arranged by a first guide 21 so as not to protrude to the outside. Thus, the formation of the bat ear 2 may be prevented to reduce the error occurring in the designed size of the secondary battery 1, and the secondary batteries 1 may be easily assembled to manufacture the battery module. Also, since the secondary battery 1 is unnecessarily reduced in volume as a whole, energy density to a volume may increase.

For this, the method for manufacturing the secondary battery 1 according to an embodiment of the present invention includes: a step of accommodating an electrode assembly 10, in which electrodes and separators are alternately stacked, in a battery case 13 of the secondary battery 1; a step of allowing a plurality of recess induction parts 20 to recess a folding part 136 folded in the battery case 13 inward to form a recess part 1362 when the battery case 13 is folded; a step of inserting one end 211 (see FIG. 12) of a first guide 21, of which one side of the one end 211 is recessed to form a concave space 212 (see FIG. 12), into the battery case 13; a step of allowing the first guide 21 to push a folding part 136 of the battery case 13 to the outside so that each of the recess induction parts 20 is inserted into the concave space 211; a step of allowing a second guide 22 to hold a sealing part 134 of the battery case 13 so as to fix the battery case 13; and a step of allowing a sealing tool 23 to apply heat and a pressure to the sealing part 135 so as to seal the sealing part 134.

Hereinafter, each of the steps illustrated in the flowchart of FIG. 9 will be described with reference to FIGS. 10 to 16.

Figure 10:
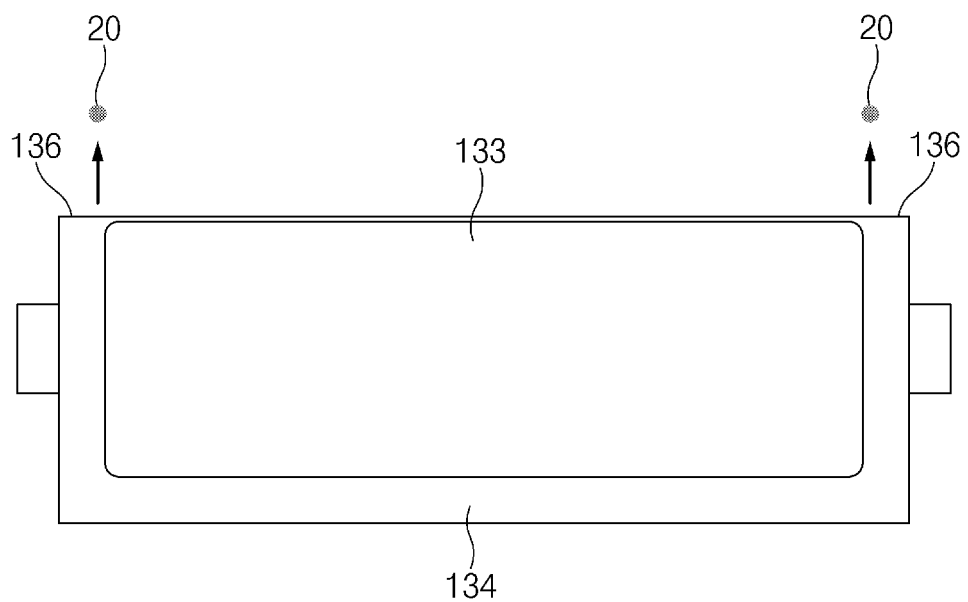
FIG. 10 is a schematic view illustrating a state in which a recess induction part and the battery case are close to each other according to an embodiment of the present invention.

FIG. 10 is a schematic view illustrating a state in which a recess induction part 20 and the battery case 13 are close to each other according to an embodiment of the present invention.

An apparatus for manufacturing a secondary battery 1 according to an embodiment of the present invention includes: a recess induction part 20 configured to allow a folding part 136 folded in a battery case 13 to be recessed inward so as to provide a recess part 1362 when the battery case 13 of the secondary battery 1 is folded; a first guide 21, of which one side of one end 211 is recessed to define a concave space 212 and into which the one end 211 is inserted into the battery case 13 to push the folding part 136 to the outside so that the recess induction part 20 is inserted into the concave space 212; and a second guide 22 configured to hold a sealing part 134 of the battery case 13 so as to fix the battery case 13. Also, the apparatus for manufacturing the secondary battery 1 may further include a sealing tool 23 that seals the sealing part 134 by applying heat or a pressure to the sealing part 134.

First, an electrode assembly 10 in which electrodes and separators are alternately stacked is accommodated in the battery case 13 (S901). When the battery case 13 is folded, before the sealing part 134 is sealed, the recess induction part 20 recesses the folding part 136 folded in the battery case 13 inward (S902). Thus, a recess part 1362 may be defined in the battery case 13.

The recess induction part 20 recesses the folding part 136 folded in the battery case 13 inward to define the recess part 1362. Here, the recess guide part 20 is easy to move. Thus, the recess guide part 20 may move toward the battery case 13. Alternatively, as illustrated in FIG. 10, the recess guide part 20 is fixed to a separate mechanism, and the battery case 13 may move toward the recess guide part 20. For example, if the battery case 13 is mounted on a worktable or a table (not shown) to perform an operation with the first guide 21 and the second guide 22 on the battery case 13 later, the recess induction part 20 may be fixed to one surface of the worktable or the table (not shown) to protrude. Alternatively, a separate stand may be fixed to the worktable or the table (not shown), and the recess guide unit 20 may be fixed to this stand (not shown). That is, if the recess induction part 20 is fixed, various methods may be used without limitation.

As illustrated in FIG. 10, the battery case 13 moves closer to the fixed recess guide part 20. Here, the folding part 136 of the battery case 13 is disposed in a direction toward the recess induction part 20. Also, the battery case 13 is pushed toward the fixed recess guide part 20. Then, the folding part 136 of the pouch type secondary battery 13 having flexibility may be recessed inward by a reaction of the fixed recess induction part 20.

As illustrated in FIG. 10, the recess induction part 20 may have a cylindrical shape, but is not limited thereto. For example, the recess induction part 20 may have various shapes such as a triangular pillar, a square pillar, and an elliptical pillar as long as the recess induction part 20 provides the recess part 1362. However, the shape of the recess part 1362 corresponds to that of the recess induction part 20. Thus, the shape of the recess part 1362 may variously vary according to the shape of the recess induction part 20.

The battery case 13 may generally include the folding parts 136 on both sides thereof. Thus, the recess parts 1362 may be disposed on both the folding parts 136, respectively. For this, the recess induction part 20 may be provided in plurality to push each of both the folding parts 136 of the battery case 13 toward the recess induction part 20 so as to provide the recess part in one operation.

Here, a distance between the plurality of recess parts 1362 to be defined in the battery case 13 and a distance between the plurality of recess induction parts 20 correspond to each other. However, since a size of the battery case 13 is different according to a model, standard, and the like of the secondary battery 1, the distance between the plurality of recess parts 1362 may not be constant. Therefore, the plurality of recess guide parts 20 may move in a straight line in a direction parallel to a direction toward each other. As a result, the distance between the plurality of recess induction parts 20 may vary to correspond to the distance between the plurality of recess parts 1362.

However, the present invention is not limited thereto, and only one recess guide part 20 may be provided, and both the folding parts 136 may be sequentially pushed toward the recess induction part 20 to perform the operation of forming the recess part 1362 twice.

Figure 11:
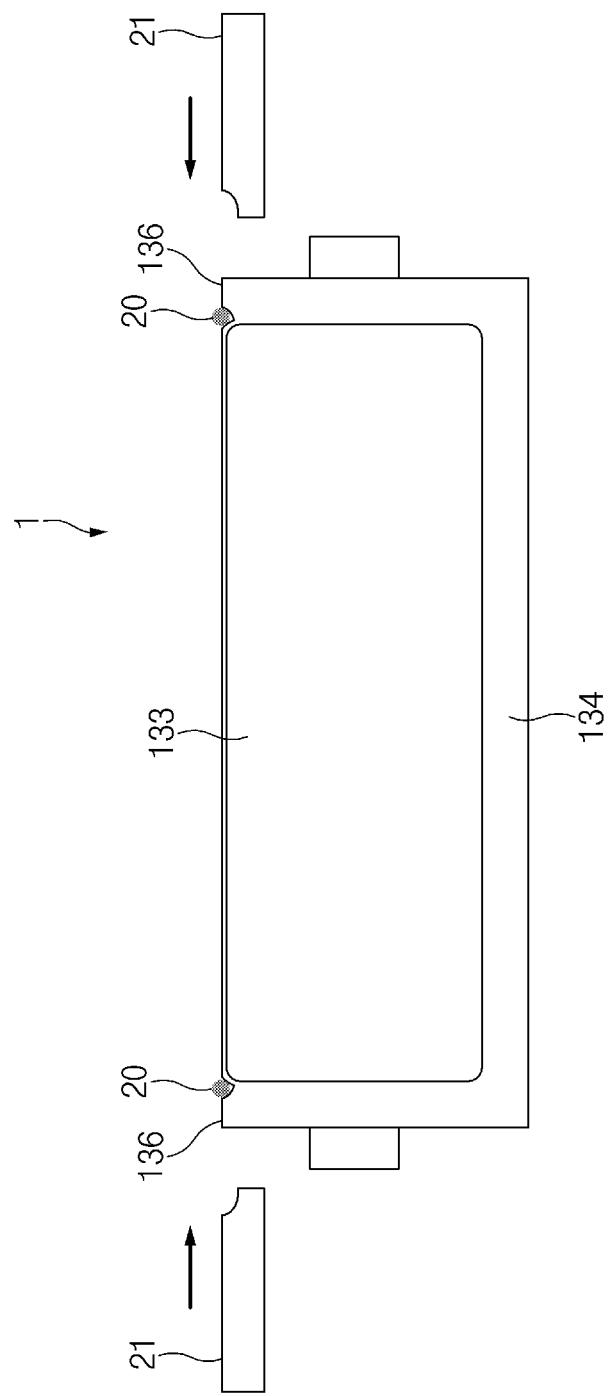
FIG. 11 is a schematic view illustrating a state in which a first guide is being inserted into the pouch type battery case according to an embodiment of the present invention.
Figure 12:
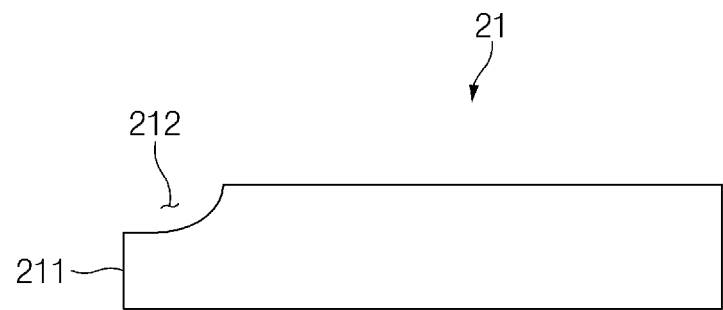
FIG. 12 is a schematic view of the first guide according to an embodiment of the present invention.

FIG. 11 is a schematic view illustrating a state in which the first guide 21 is being inserted into the pouch type battery case 13 according to an embodiment of the present invention, and FIG. 12 is a schematic view of the first guide 21 according to an embodiment of the present invention.

After the recess part 1362 is defined, as illustrated in FIG. 11, before the sealing part 134 is sealed, the first guide 21 is inserted into the battery case 13 through the sealing part 134 (S903). Here, the first guide 21 has a bar shape, and one side of one end 211 of the first guide 21 is recessed inward to define the concave space 212. The first guide 21 is inserted into the battery case 13 so that the recessed one end 211 faces the inside of the battery case 13.

Particularly, in the first guide 21 according to an embodiment of the present invention, as illustrated in FIG. 12, it is preferable that the one side of the one end 211 is filleted inward. As a result, one side of the one end 211 defines the concave space 212 with a curved surface, and when the one end 211 pushes the folding part 136 of the battery case 13 outward, the folding part 136 is inserted into the concave space 212 together with the recess induction part 20. Therefore, the shape of the formed recess part 1362 may be firmed.

Figure 13:
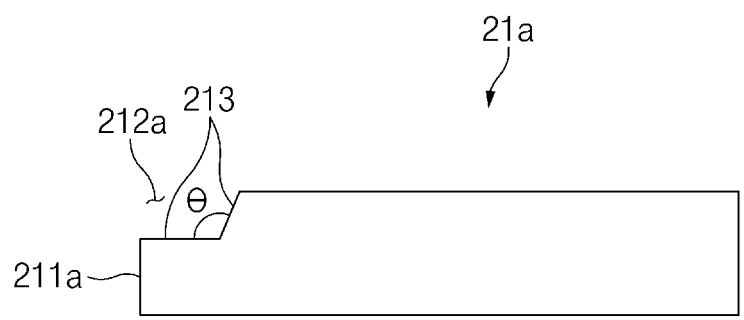
FIG. 13 is a schematic view of a first guide according to another embodiment of the present invention.

FIG. 13 is a schematic view of a first guide 21a according to another embodiment of the present invention.

In the first guide 21a according to another embodiment of the present invention, as illustrated in FIG. 13, one side of one end 211a may be chamfered inward. Particularly, the first guide 21a has one side of the one end 211a, which is recessed inward and chamfered to define a concave space 212a with a plurality of planes 213. The first guide 21a is inserted into the battery case 13 so that the recessed one end 211a faces the inside of the battery case 13.

Also, when the one end 211a pushes the folding part 136 of the battery case 13 to the outside, the folding part 136 is inserted into the concave space 212a together with the recess induction part 20. Here, an exterior angle θ defined by the plurality of planes 213 of the first guide 21a forming the concave space 212a may be an obtuse angle.

Figure 14:
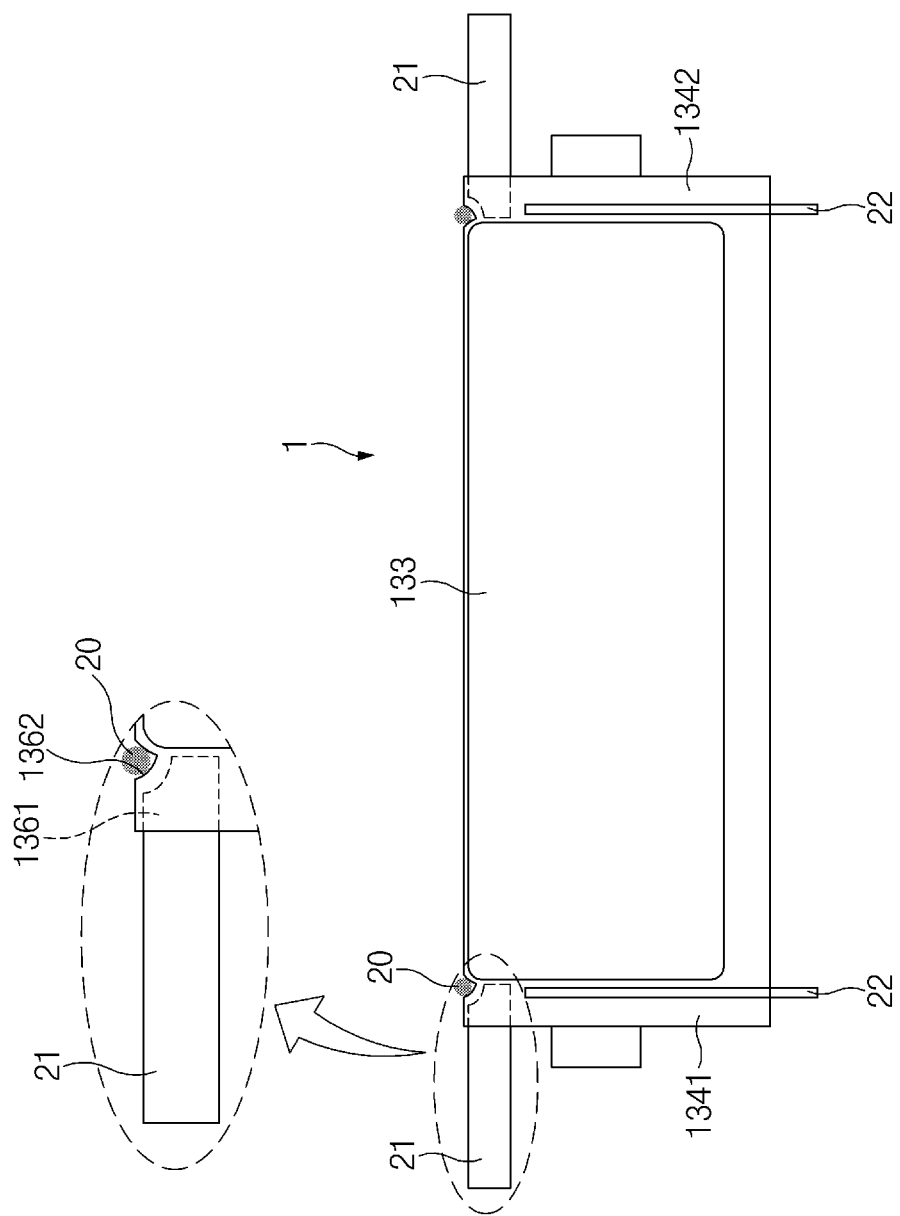
FIG. 14 is a schematic view illustrating a state in which a second guide is holding a sealing part of the pouch type battery case according to an embodiment of the present invention.

FIG. 14 is a schematic view illustrating a state in which the second guide 22 is holding the sealing part 134 of the pouch type battery case 13 according to an embodiment of the present invention.

When the first guide 21 is inserted into the battery case 13, the first guide 21 contacts the folding part 136 of the battery case 13. Here, since the first guide 21 has a certain thickness, a portion 1361 of the folding part 136, which has conventionally formed as the bat ear 2, is used to surround a periphery of the first guide 21. Also, the first guide 21 pushes the folding part 136 to the outside (S904). Thus, as illustrated in FIG. 14, the folding part 136 may be inserted into the concave space 212 together with the recess induction part 20. Here, when the first guide 21 has an excessively thick thickness, it may be difficult to insert the first guide 21 through the sealing part 134 of the battery case 13. Thus, it is preferable that a thickness of the first guide 21 is thinner than that when the battery case 13 is folded.

The second guide 22 holds the sealing part 134 of the battery case 13 to fix the battery case 13 (S905). Particularly, as illustrated in FIG. 14, it is preferable that the second guide 22 may hold each of a first sealing part 1341 and a second sealing part 1342 from which the electrode tabs 11 protrude, respectively. The second guide 22 may have a forceps shape to easily hold the sealing part 134 and may hold the sealing part 134 from opposing surfaces.

When the second guide 22 holds the sealing part 134, it is preferable that the second guide 22 holds the sealing part 134 except for the folding part 136 as illustrated in FIG. 14, rather than holding the entire sealing part 134. Since the first guide 21 is still inserted into the battery case 13, when the second guide 22 holds the sealing part up to the folding part 136 in which the first guide 21 is inserted, the first guide 21 is not easily pulled out from the battery case 13 later.

When the sealing tool 23 seals the sealing part 134 later, it is preferable that the second guide 22 continuously holds the sealing part 134 to fix the battery case 13. However, if the second guide 22 holds a central area of the sealing part 134, the second guide 22 may interfere with the sealing of the sealing part 134. Therefore, it is preferable that the second guide 22 hold an area of the sealing part 134, which is adjacent to the cup part 133 as much as possible.

Figure 15:
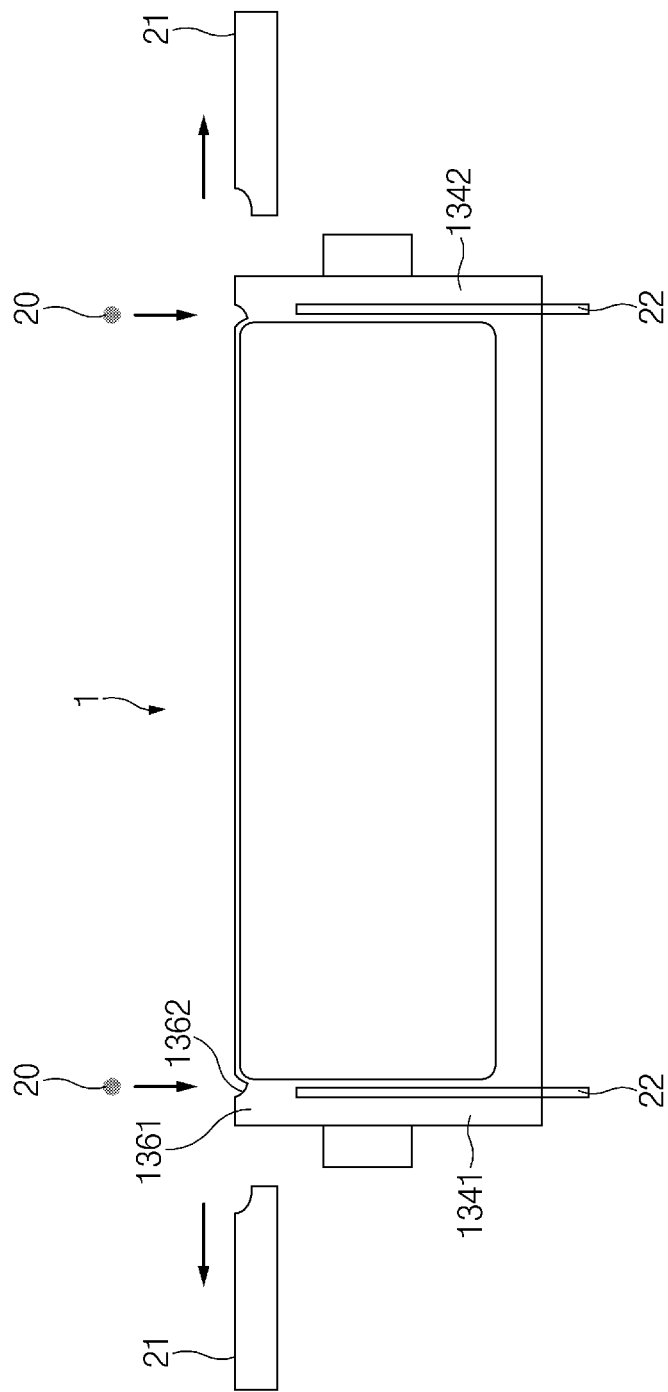
FIG. 15 is a schematic view illustrating a state in which the first guide is being pulled out from the pouch type battery case according to an embodiment of the present invention.
Figure 16:
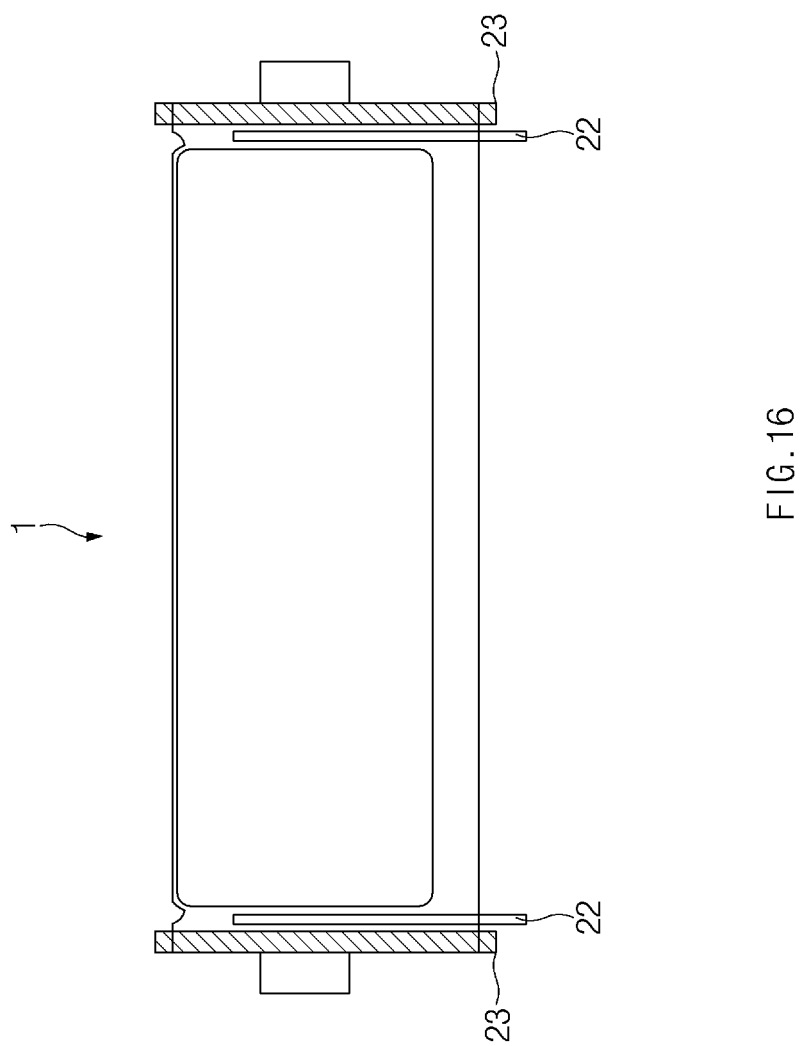
FIG. 16 is a schematic view illustrating a state in which a sealing tool seals a sealing part of the pouch type battery case according to an embodiment of the present invention.

FIG. 15 is a schematic view illustrating a state in which the first guide 21 is being pulled out from the pouch type battery case 13 according to an embodiment of the present invention, and FIG. 16 is a schematic view illustrating a state in which the sealing tool 23 seals the sealing part 134 of the pouch type battery case 13 according to an embodiment of the present invention.

As illustrated in FIG. 15, the first guide 21 is pulled out from the battery case 13 before the sealing part 134 is sealed (S906). This is because the first guide 21 is not sealed together when the sealing part 134 is sealed. In addition, heat and a pressure are applied to the sealing part 134 by using the sealing tool 23 to seal the sealing part 134 (S907). Here, as described above, since the second guide 22 interferes with the sealing of the sealing part 134, the second guide 22 holds an area of the sealing part 134, which is adjacent to the cup part 133 as much as possible. Thus, as illustrated in FIG. 16, the sealing tool 23 seals the outside of the area of the sealing part 134, which is held by the second guide 22. Here, in order to firmly seal the sealing part 134, the area to be sealed has to be as wide as possible. Therefore, it is preferable that the second guide 22 has a thin width as much as possible.

As described above, the second guide 22 may hold the sealing part 134 except for the folding part 136. On the other hand, as illustrated in FIG. 16, the sealing tool 23 may seal the sealing part 134 up to both ends of the sealing part 134 in addition to the folding part 136. This is because when sealing the sealing part 134 except for the folding part 136 during the sealing, the internal electrolyte leaks, or external foreign substances are permeated.

When the first guide 21 is pulled out, and the sealing part 134 of the battery case 13 is sealed, the folding part 136 is recessed inward as a whole and then sealed by the recess part 1362, which has been inserted into the concave space 212 of the first guide 21. Thus, the formation of the bat ear 2 may be prevented to reduce the error occurring in the designed size of the secondary battery 1, and the secondary batteries 1 may be easily assembled to manufacture the battery module. Also, since the volume of the secondary battery 1 is reduced as a whole by removing an unnecessary space, the energy density to the volume may increase.

Those with ordinary skill in the technical field to which the present invention pertains will understand that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing a secondary battery, the apparatus comprising:
    a recess induction part configured to allow a folding part folded in a battery case of a secondary battery to be recessed inward so as to provide a recess part when the battery case of the secondary battery is folded;
    a first guide, of which one side of one end is recessed to define a concave space, wherein, when the battery case of the secondary battery is folded, the one end is configured to be inserted into the battery case to push the folding part to an outside so that the recess induction part is configured to be inserted into the concave space; and
    a second guide configured to hold a sealing part of the battery case so as to fix the battery case.

2. The apparatus of claim 1, wherein the recess induction part includes a plurality of recess induction parts configured to move linearly in a direction parallel to a direction toward each other.

3. The apparatus of claim 1, wherein the first guide is inserted into the battery case through the sealing part before the sealing part is sealed.

4. The apparatus of claim 1, wherein, when the first guide pushes the folding part to the outside, the folding part is inserted into the concave space together with the recess induction part to define a recess part.

5. The apparatus of claim 1, wherein, in the first guide, the one side of the one end is recessed inward to be filleted.

6. The apparatus of claim 1, wherein, in the first guide, the one side of the one end is recessed inward and filleted to define the concave space with a plurality of planes, and an exterior angle defined by the plurality of planes is provided as an obtuse angle.

7. The apparatus of claim 1, further comprising a sealing tool configured to apply heat and a pressure to the sealing part to seal the sealing part.

8. The apparatus of claim 7, wherein, before the sealing part is sealed, the first guide is pulled out from the battery case.

9. The apparatus of claim 1, wherein the first guide has a thickness less than a thickness of the battery case when the battery case is folded.

10. The apparatus of claim 1, wherein the second guide has a forceps shape so that it is configured to hold the sealing part from opposing surfaces.

11. The apparatus of claim 10, wherein the first guide has a bar shape.

12. The apparatus of claim 1, wherein the recess induction part is a pillar.

13. The apparatus of claim 1, wherein the recess induction part is a triangular pillar, a square pillar, or an elliptical pillar.

14. A method for manufacturing a secondary battery, the method comprising:
   accommodating an electrode assembly, in which electrodes and separators are alternately stacked, in a battery case;
   recessing a folding part folded in the battery case inward with a recess induction part to form a recess part when the battery case is folded;
   inserting one end of a first guide, of which one side of the one end is recessed to form a concave space, into the battery case;
   pushing the folding part of the battery case to an outside with the first guide so that the recess induction part is inserted into the concave space;
   fixing the battery case by holding a sealing part of the battery case with a second guide; and
   sealing the sealing part by applying heat and a pressure to the sealing part with a sealing tool.

15. The method of claim 14, further comprising, after the step of fixing the battery case and before the step of sealing the sealing part, a step of pulling out the first guide from the battery case.

16. The method of claim 14, wherein the step of inserting the one end of the first guide includes inserting the first guide into the battery case through the sealing part.

17. The method of claim 14, the step of pushing the folding part to the outside includes allowing a portion of the folding part together with the recess induction part to be inserted into the concave space of the first guide.

18. The method of claim 14, wherein the first guide has a thickness less than a thickness of the battery case when the battery case is folded.

19. The method of claim 14, wherein the step of fixing the battery case includes holding the sealing part from opposing surfaces with the second guide having a forceps shape.

* * * * *